United States Patent
Halkosaari et al.

(10) Patent No.: US 9,397,595 B2
(45) Date of Patent: Jul. 19, 2016

(54) PMSM ROTOR ANGLE IDENTIFICATION

(71) Applicant: VACON OYJ, Vaasa (FI)

(72) Inventors: Tero Halkosaari, Lempäälä (FI); Jarno Hoffren, Lempäälä (FI)

(73) Assignee: VACON OYJ, Vaasa (FI)

( * ) Notice: Subject to any disclaimer, the term of this patent is extended or adjusted under 35 U.S.C. 154(b) by 95 days.

(21) Appl. No.: 14/537,076

(22) Filed: Nov. 10, 2014

(65) Prior Publication Data
US 2015/0171781 A1     Jun. 18, 2015

(30) Foreign Application Priority Data

Dec. 16, 2013    (FI) ..................................... 20136267

(51) Int. Cl.
    *H02P 6/18*    (2016.01)
(52) U.S. Cl.
    CPC ............... *H02P 6/185* (2013.01); *H02P 21/32* (2016.02)
(58) Field of Classification Search
    CPC ............. H02P 6/16; H02P 6/18; H02P 6/183; H02P 6/185
    USPC ....................... 318/400.32, 400.33
    See application file for complete search history.

(56) References Cited

U.S. PATENT DOCUMENTS

| | | | | | |
|---|---|---|---|---|---|
| 4,088,934 | A | * | 5/1978 | D'Atre | B60L 11/1803 318/802 |
| 4,814,677 | A | * | 3/1989 | Plunkett | H02P 6/08 318/400.02 |
| 6,396,229 | B1 | * | 5/2002 | Sakamoto | H02P 6/18 318/400.02 |
| 7,723,937 | B2 | * | 5/2010 | Kurosawa | G11B 19/2054 318/400.32 |

\* cited by examiner

*Primary Examiner* — Bentsu Ro
(74) *Attorney, Agent, or Firm* — Birch, Stewart, Kolasch & Birch, LLP

(57) ABSTRACT

A method and a control device for identifying the angle and polarity of the rotor of a permanent magnet synchronous motor (PMSM), the motor including a stator, including windings and a rotor including at least two permanent magnets. The method includes the steps of determining the rotor d-axis direction by supplying a stator voltage vector pulses to the motor terminals at at least two different stator angles, measuring the phase current at each angle, and determining rotor d-axis position based on motor inductance value in each stator angles calculated from the measured values and determining the rotor d-axis polarity by supplying a current vector to the motor terminals at the q-axis direction, and determining the magnet polarity by observing the direction of the rotor rotation during the test pulses.

20 Claims, 2 Drawing Sheets

PMSM ROTOR ANGLE IDENTIFICATION

FIELD OF TECHNOLOGY

This invention relates to an identification of the rotor angle in an electric motor. More precisely, the invention is related to a method for identifying the angle and polarity of the d-axis in a permanent magnet synchronous motor (PMSM) before start.

BACKGROUND AND DESCRIPTION OF THE PRIOR ART

Three-phase induction motors have been widely recognized as workhorses of many industrial applications. Because of dramatic improvements in magnetic and thermal properties of permanent magnet materials, synchronous PM motors represent viable alternatives within this group, e.g. due to its high efficiency. From the control point of view permanent magnet synchronous motors are appropriate for applications with load-independent speeds or synchronous operation with high accuracy under defined speed.

Precise speed control of AC motors is typically accomplished with a frequency converter connected to a shaft speed or position feedback sensor. For controlling a PM synchronous motor ideally, the rotor angle has to be known by the control system. There are many known methods for identification the rotor angle, e.g. injecting AC signal or spatially distributed DC current pulses to the stator terminals and exploiting anisotropy in analyzing the signal response when determining the rotor orientation. Regardless of rotor structure the polarity detection of d-axis is normally based on stator saturation; current fed along the flux reduces the inductance more than current fed against the flux, making the polarity of d-axis observable. This, however, is not the case with all PM motors. In some cases, due to the motor design it may result that stator is not saturating with practical amount of current, which means that identifying the d-axis polarity and thus also the rotor exact angle cannot be done.

SUMMARY OF THE INVENTION

The object of the present invention is to provide a novel method for identifying the d-axis polarity and thus also the exact angle of the rotor of a permanent magnet synchronous motor. The objective is achieved by what is stated in the independent claims. Other preferred embodiments of the invention are disclosed in the dependent claims.

The acts for rotor angle identification are performed before starting the motor. The shaft rotation direction needs to be measured e.g. by an encoder, in order to be able to perform the identification measures according to the invention. The method is based on the assumption that the direction of the d-axis has already been found out, e.g. by using some of the known methods, and only the polarity of it needs to be identified.

For the identification, short test current pulses, producing torque at a desired angle, are supplied to the stator windings. The method exploits the relationship between the torque producing current and the rotor position angle. When the guess of the orientation is correct, a positive torque reference produces positive actual torque, resulting shaft rotation to a positive direction. Respectively, if the orientation error is 180°, a positive torque reference produces negative actual torque, causing the shaft rotation to a negative direction. Same, of course, applies also for a negative torque reference. Thus, if the shaft is able to rotate, the polarity identification can be done by observing the direction of the rotor rotation during the test pulses. A very small turning of the rotor is enough for the identification, e.g. 2 mechanical degrees which is less than the normal gear clearance.

The polarity identification starts by increasing the stator current vector at the q-axis direction, thus producing torque which starts to rotate the shaft, to a predefined level. When this level is reached the reference value is latched and held for a predefined time. If the rotor rotation angle during this time exceeds a threshold limit, the sequence is stopped at once because the polarity detection is considered to be reliable. If the threshold limit is not reached before the time has elapsed, the torque reference is ramped to an opposite predefined value, latched and held for a predefined time similarly to the first guess. If the rotor angle is not rotating above the limit before the predefined time has elapsed (e.g. the shaft is locked) the identification cannot be done.

The known methods for the rotor angle identification in PM motors are based on the saturation of the stator. If this is not the case, the method according to the present invention is the only way to detect the magnet polarity.

BRIEF DESCRIPTION OF THE DRAWINGS

Below the invention appears a more detailed explanation using examples with references to the enclosed figures, wherein.

DETAILED DESCRIPTION OF THE INVENTION

Figure 1:
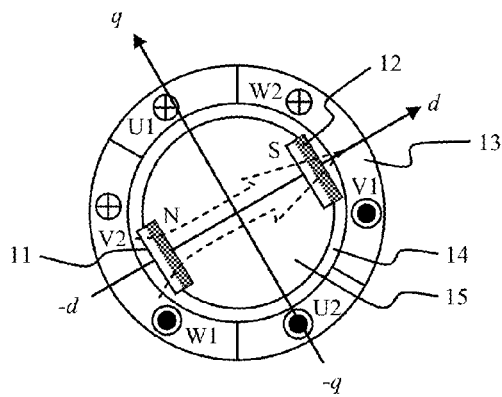
FIG. 1 presents a cross section of a PM synchronous motor.

FIG. 1 presents a known cross section of a permanent magnet synchronous motor. In order to focus on clear understanding of the invention, the principal structure of a simple two pole motor is shown in the figure, but as is clear for those of ordinary skill in the art the description of the method presented below is valid also for motors having more pole pairs.

The motor has a stator 13, including windings U1-U2, V1-V2, W1-W2, a rotor 15 and an air gap 14 between them. The rotor includes two permanent magnets 11, 12, having the same polarity and forming a magnetic flux, indicated by an arrow drawn by the dashed line. The direction of the main rotor flux is normally marked by a symbol d (direct axis) and the axis between d-axises by a symbol q (quadrature axis). Polarities are normally marked as in FIG. 1; the d-axis positive direction is the same as the direction of the magnetic flux and the q-axis positive direction counterclockwise from it.

A three-phase AC current supplied to the stator windings create a rotating magnetic field, which interacts with the magnetic field created by the rotor magnets, thus causing the rotation of the rotor.

Figure 2:
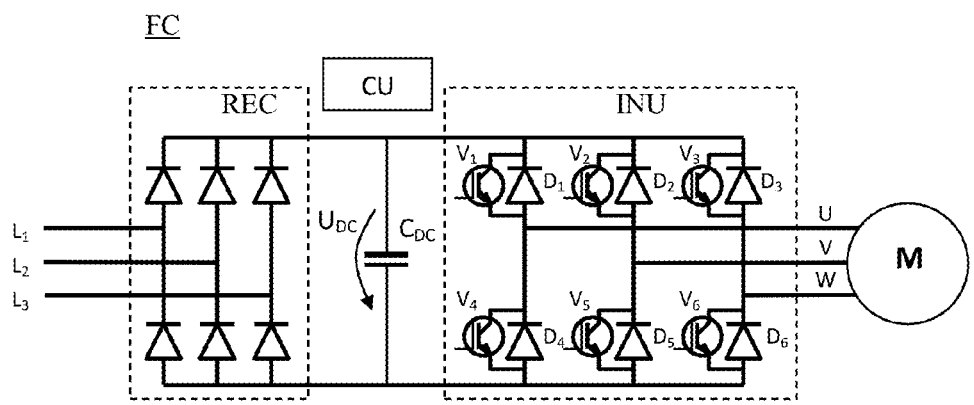
FIG. 2 presents a speed controlled motor drive.

FIG. 2 presents a main diagram of a known and typical variable speed motor drive, wherein a frequency converter FC is used to control the speed of an AC motor, e.g. a synchronous permanent magnet motor M. The frequency converter FC in this example contains a diode-bridge rectifier REC, rectifying the three-phase supply voltage $L_1$, $L_2$, $L_3$ into a constant DC-link voltage $U_{DC}$ which is smoothed by a capacitor $C_{DC}$, a three-phase inverter unit INU, consisting of IGBT-switches $V_1 \ldots V_6$ and free-wheeling diodes $D_1 \ldots D_6$ and a control unit CU. An inductive component is normally used in either side of the rectifier, in order to filter the harmonics of the supply phase current, but as an irrelevant component from the present invention point of view it has been left out from the figure. The basic function of the inverter is to create a three-phase adjustable output voltage U, V, W for the motor M. Means for measuring the output phase currents are normally included in the inverter unit (not drawn). Under the so-called vector control the motor phase currents can be controlled so that the current vector at the desired angle generates shaft rotating torque.

Figure 3:
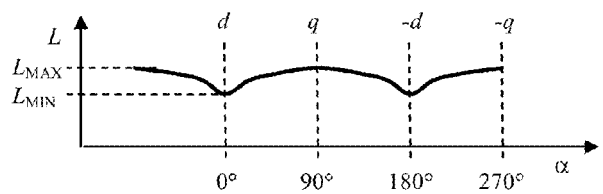
FIG. 3 presents an inductance curve of a PM synchronous motor.

FIG. 3 presents a known characteristic curve of the inductance L of the rotor of a permanent magnet motor, measured from the stator, and as a function of the rotor angle α. In this example the angle of the d-axis is marked as 0°, q-axis 90°, etc (see FIG. 1). At the direction of d-axis the inductance is at its minimum value $L_{MIN}$, and at the direction of q-axis at its maximum value $L_{MAX}$, respectively. The direction of the axis doesn't have any effect on the inductance value, e.g. the value seen from the d-axis direction is the same as from the opposite side (marked as the −d end of the axis in FIG. 1).

This characteristic feature of the rotor inductance is used in prior art for finding out the rotor position before starting the frequency converter controlled PM motor. A normal method is to supply an AC voltage or short-time DC voltage pulses to the motor terminals, at different stator coordinate angles, and measure the phase currents. From the voltage and current values the motor inductance value can be calculated in each stator angle, which gives the information of the rotor d-axis position.

According to the method of the present invention, in the first phase the rotor d-axis direction is determined in the known way described above. In the second phase the rotor position is identified in a more accurate way, by recognizing also the polarity of the d-axis. For this purpose the shaft rotation needs to be measured e.g. by an encoder. In the method a current vector is supplied to the motor, which creates a stator magnetic flux in the direction of the identified q-axis. Thus the stator and rotor magnetic fluxes interact, creating a torque which starts to turn the rotor d-axis to the direction of the q-axis. In praxis the necessary motion of the rotor for the identification is small, e.g. 2 mechanical degrees, which is normally available within the gear clearance.

Figure 4:
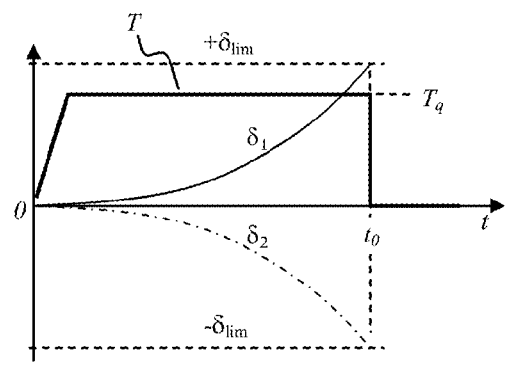
FIG. 4 presents a successful PMSM rotor identification.

FIG. 4 presents a successful identification process according to the present invention, by referring to the markings of FIG. 1. In the first example case of the figure, the stator current vector has the same direction and polarity as the q-axis in FIG. 1, thus producing a positive torque T, having a peak value $T_q$, which starts to turn the rotor counterclockwise (the positive end of the d-axis arrow turns to the direction of q-axis positive end. The curve $\delta_1$ presents the rotor rotation angle from the starting point during the identification. The rotor turns until its rotation angle reaches the limit $+\delta_{lim}$ at time instant $t_0$. Reaching the limit is a mark of a successful identification of the rotor position, and the torque pulse will be terminated immediately. In this case it is now known that the d-axis direction and polarity is as indicated in FIG. 1.

If the original direction of the rotor d-axis is opposite, the rotor starts to turn in another direction, clockwise, according to curve $\delta_2$. Similarly than above, when the angle reaches the limit $-\delta_{lim}$ the torque pulse will be terminated and the start electric angle of the d-axis is corrected 180°.

Figure 5:
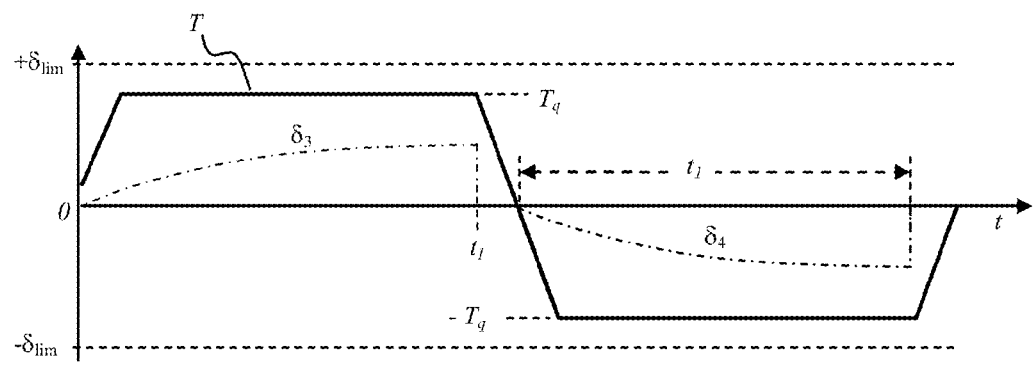
FIG. 5 presents an unsuccessful PMSM identification.

FIG. 5 presents an unsuccessful identification process when using the method of the present invention. According to the method, the torque T is first kept at the peak value $T_q$ for a predefined maximum time $t_1$. If the rotor rotation angle $\delta_3$ does not reach the threshold limit $+\delta_{lim}$ during this time, the value of the rotor position is set to zero and the torque value is changed to an opposite value $-T_q$. If the rotor rotation angle $\delta_4$ in this direction does not either in this direction reach the threshold limit $-\delta_{lim}$ within the predefined time limit $t_1$, the rotor position cannot be detected. In this case e.g. the time limit value ($t_1$) or the torque pulse amplitude ($T_q$), or both, may be increased and a new try made.

While the invention has been described with reference to the previous embodiment, it should be recognized that the invention is not limited to this embodiment, and many modifications and variations will become apparent to persons skilled in the art without departing from the scope and spirit of the invention, as defined in the appended claims.

The invention claimed is:

1. A method for identifying the angle and polarity of the rotor of a permanent magnet synchronous motor (PMSM), controlled by a frequency converter, the motor comprising a stator, including windings and a rotor comprising at least two permanent magnets, wherein the method comprises:
   determining the rotor d-axis direction by supplying stator voltage vector pulses to the motor terminals at at least two different angles, measuring the phase current at each angle, and determining the rotor d-axis direction based on motor inductance values in each stator angle, which inductance values have been calculated from the measured values, and
   determining the rotor d-axis polarity by supplying a torque producing current vector to the motor terminals at the q-axis direction, and determining the magnet polarity by observing the direction of the rotor rotation during the test pulses.

2. A method according to claim 1 wherein stator voltage vector pulses for determining the rotor d-axis direction are AC voltage.

3. A method according to claim 2 wherein the polarity determination starts by setting the stator current vector at the q-axis direction, thus producing rotor rotating torque, which torque is increased to a predefined level and when the predefined torque level is reached, the predefined torque level is held for a predefined time.

4. A method according claim 2 wherein the polarity of the rotor is identified on the basis of a small rotor rotation, e.g. around 2 mechanical degrees.

5. A method according to claim 2 wherein the rotor polarity identification is performed before starting the motor.

6. A method according to claim 1 wherein stator voltage vector pulses for determining the rotor d-axis direction are DC voltage pulses.

7. A method according to claim 6 wherein the polarity determination starts by setting the stator current vector at the q-axis direction, thus producing rotor rotating torque, which torque is increased to a predefined level and when the predefined torque level is reached, the predefined torque level is held for a predefined time.

8. A method according claim 6 wherein the polarity of the rotor is identified on the basis of a small rotor rotation, e.g. around 2 mechanical degrees.

9. A method according to claim 6 wherein the rotor polarity identification is performed before starting the motor.

10. A method according to claim 1 wherein the polarity determination starts by setting the stator current vector at the q-axis direction, thus producing rotor rotating torque, which torque is increased to a predefined level and when the predefined torque level is reached, the predefined torque level is held for a predefined time.

11. A method according to claim 10 wherein the current vector supply to the motor is terminated before a predefined time if the rotor rotation angle exceeds a threshold limit.

12. A method according claim 11 wherein the polarity of the rotor is identified on the basis of a small rotor rotation, e.g. around 2 mechanical degrees.

13. A method according to claim 10 wherein the torque is ramped to an opposite predefined value and held for a predefined time if the threshold limit of the rotation angle is not reached before the predefined time has elapsed.

14. A method according claim 13 wherein the polarity of the rotor is identified on the basis of a small rotor rotation, e.g. around 2 mechanical degrees.

15. A method according claim 10 wherein the polarity of the rotor is identified on the basis of a small rotor rotation, e.g. around 2 mechanical degrees.

16. A method according to claim 10 wherein the rotor polarity identification is performed before starting the motor.

17. A method according to claim 1 wherein the polarity of the rotor is identified on the basis of a small rotor rotation, e.g. around 2 mechanical degrees.

18. A method according to claim 1 wherein the rotor polarity identification is performed before starting the motor.

19. A control device of a permanent magnet synchronous motor (PMSM), the motor connected to the control device and motor comprising a stator, including windings and a rotor comprising at least two permanent magnets, wherein
   the control device is configured to carry out the methods steps of claim 1.

20. A control device according to claim 19, wherein the control device is a frequency converter.

* * * * *